Sept. 7, 1926.
H. N. BERRY
1,599,313
COTTON PICKER
Filed May 26, 1925
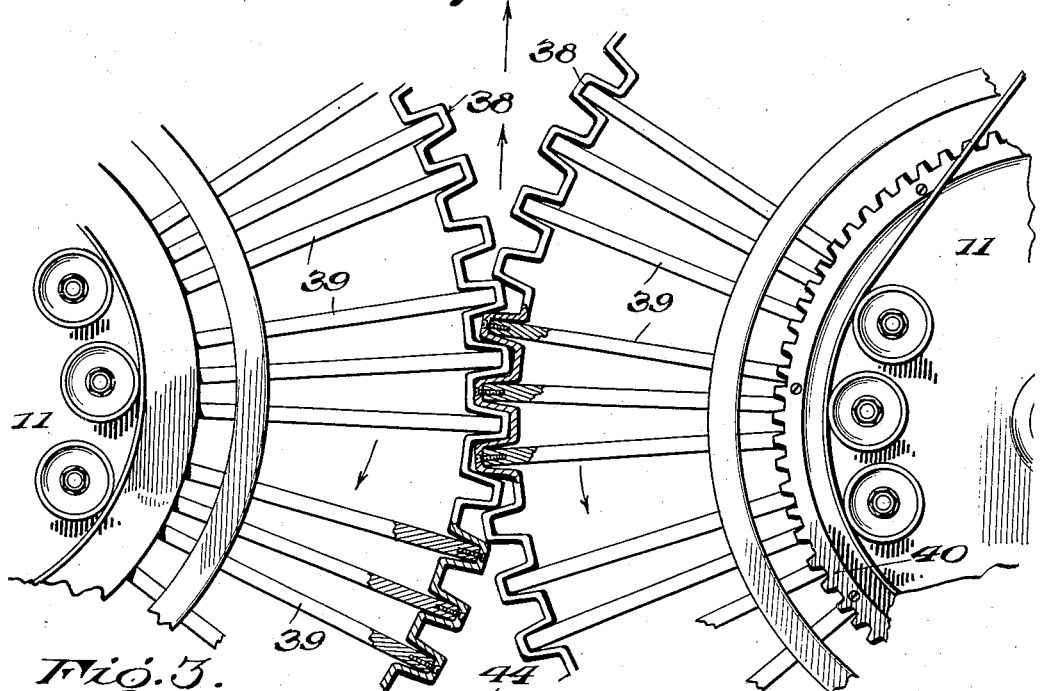
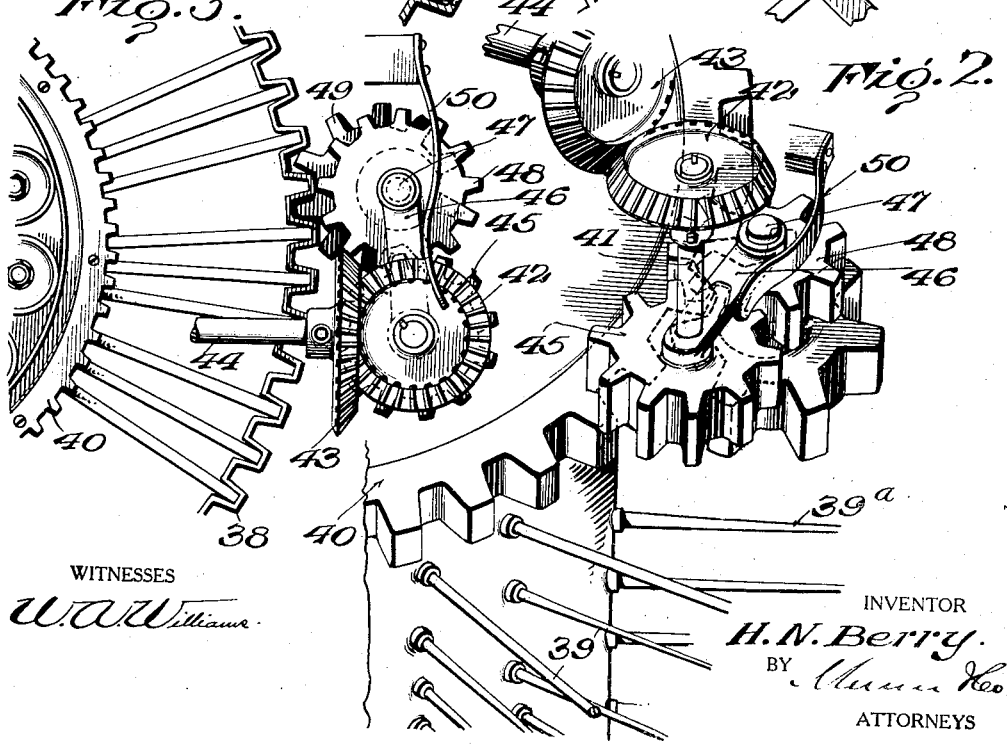
WITNESSES
W. A. Williams
INVENTOR
H. N. Berry
BY
ATTORNEYS Patented Sept. 7, 1926.

1,599,313

UNITED STATES PATENT OFFICE.

HIRAM NEWTON BERRY, OF GREENVILLE, MISSISSIPPI, ASSIGNOR OF ONE-THIRD TO HUGH A. GAMBLE, OF GREENVILLE, MISSISSIPPI.

COTTON PICKER.

Application filed May 26, 1925. Serial No. 32,986.

My present invention relates generally to cotton pickers of the type described and claimed in my Patent No. 1,530,151 dated March 17, 1925, and my co-pending application #47917 filed Aug. 3, 1925, both including cotton pickers which operate by virtue of two sets of picking fingers rotating on their own axes and radiating from supporting cylinders revoluble about vertical axes and in parallel spaced apart relation so that the ends of the two sets of fingers just avoid contact.

In my previous apparatus just mentioned, I have provided cylinder construction and finger rotating means permitting the use of approximately as many fingers radiating from the cylinders as found practicable in use and in each instance I have proposed to revolve the cylinders at the same speed as that of the moving vehicle supporting the cylinders, so that the fingers thus pass into and out of the plants in use with little if any danger of tearing the latter.

I have found, however, that by slightly varying the continuous even rotation of the cylinders or in other words, by driving the cylinders alternately fast and slow during each revolution thereof, the fingers will in effect be shifted bodily with respect to the plants in use and their effectiveness in seeking out the open cotton will be materially increased. In fact, I have found that so far as results are concerned, this change in the revolution of the cylinders is equivalent to the addition of many fingers on the the cylinders and this is especially important owing to the impracticability of adding fingers in any material number to the present arrangement, coupled with the ever present desire to increase the percentage of picked cotton. It is one of the main objects of my present invention to bring about this advantage. At the same time it becomes equally important and another object of the invention is to provide direct connections between the cylinders of such nature as to insure movement of the fingers of one cylinder in properly alternating relation with the fingers of the other cylinder, between the cylinders and in this way avoid all danger of clashing of the fingers as well as roping or twisting of the cotton except around the individual fingers as intended.

In the accompanying drawing illustrating my present invention and forming a part of this specification, Figure 1 is a top plan view of the adjustable portions of the two spaced apart cylinders, showing the same directly geared to one another in accordance with my present invention.

Figure 2 is a detailed perspective view of the cylinder driving means for producing alternately fast and slow movement during each revolution, and Figure 3 is a top plan view of the parts shown in Figure 2.

Referring now to these figures, I have shown certain parts of my cotton picking apparatus including the picking cylinders 11 and it is the aim of my present invention to connect these cylinders to one another so as to insure synchronous movement thereof for the purpose before described. This may be accomplished by means of previously formed gear-like strips 38 attached to the ends of the upper circular series of guide fingers 39 which do not rotate as distinguished from the picking fingers 39ª which do rotate. Each picker cylinder has such guide fingers 39, used according to my application 47,919, above mentioned, for the purpose of cooperating with other means in the stripping of the cotton from the fingers after they are picked. As shown, the gear-like strips 38 are formed of sheet metal pressed between spaced gears and the means proposed by my present invention for the purpose of revolving cylinders may either engage one of the tooth or gear-like strips 38 or may be applied to a ring gear 40 such as shown in Figures 1 and 2. I have indicated the driving connections applied to the tooth or gear-like rings 38 in Figure 3 while in Figure 2 I have shown such means applied directly to a ring gear 40. The driving means includes a vertical shaft 41 at whose upper end is a beveled gear 42 engaged by the beveled gear 43 of a driven shaft 44, the latter geared in practice to the vehicle driving means. Shaft 41 has a lower spur gear 45 and is provided above and below gear 45 with outstanding swinging links 46 which support at their outer ends a vertical shaft 47 having formed thereon an upper spur gear 48 in mesh with the spur gear 45 of shaft 41. Shaft 47 has also formed thereon below gear 48 an eccentric gear 49 which directly engages either the tooth or gear-like strip 38 of one of the picker cylinders or the ring gear 40 as the case may be, the swinging links 46 permitting shifting movement of the shaft 47 toward and away from the particular cylinder in order that the teeth of the eccentric gear may remain in engaged position at all times. It is obvious that each complete rotation of the shaft 47 brings about alternating fast and slow movements of the cylinders and it is also obvious that uniform engagement of the eccentric gear may be assured by utilizing a spring 50 shown engaging the upper link 46 supporting the shaft 47.

By virtue of the fact that the cylinders thus revolve alternately fast and slow during each revolution, there is some bodily shifting movement of each of the picker fingers within the plants, in addition to the rotation of such fingers during their passage through the plants. This bodily shifting movement of each finger is sufficient to greatly assist in the picking operation but is not such as to materially increase the danger of tearing of the plants, and I have found the means I propose at present to be an admirable substitute in practice for a great increase in the number of picking fingers.

I claim:

1. In a cotton picker, revoluble picker cylinders having rotating picking fingers and constrained to synchronous movement, and means for revolving said cylinders including connections imparting alternate fast and slow movements to the cylinders during each revolution thereof.

2. In a cotton picker, revoluble picking cylinders having radially outstanding picker fingers and having a geared connection whereby to insure synchronous movement thereof, and means for revolving said cylinders including a gear arrangement imparting alternate fast and slow movements to the cylinders during each revolution thereof.

3. In a cotton picker, revoluble picker cylinders having outstanding picker fingers and connections for revolving the cylinders including an eccentrically mounted gear in operative connection with one of the cylinders, said gear having a movable support permitting the same to yield toward and away from the cylinder.

4. In a cotton picker, revoluble picker cylinders having radially outstanding picker fingers, a gear member carried by one of said cylinders, and means for revolving the cylinders including an eccentrically mounted gear engaging the said gear member and arranged to yield bodily toward and away from the cylinder, the said cylinders being connected and constrained to synchronous movement.

5. In a cotton picker, revoluble picker cylinders having radially outstanding picker fingers and having means constraining the same to synchronous movement, a driven shaft adjacent to one of said cylinders, a second shaft spaced from and paralleling the first shaft, gears connecting said shafts, a gear member carried by one of the cylinders, a gear eccentrically supported by said second shaft to engage the cylinder gear member, and connections between said shafts permitting the second shaft to swing toward and away from the cylinder whereby the said eccentric gear may yield in maintaining cooperative relation with the cylinder gear member.

HIRAM NEWTON BERRY.